Feb. 11, 1936.  E. R. PRATT  2,030,267
FERTILIZED MULCH PAPER
Filed Jan. 7, 1935
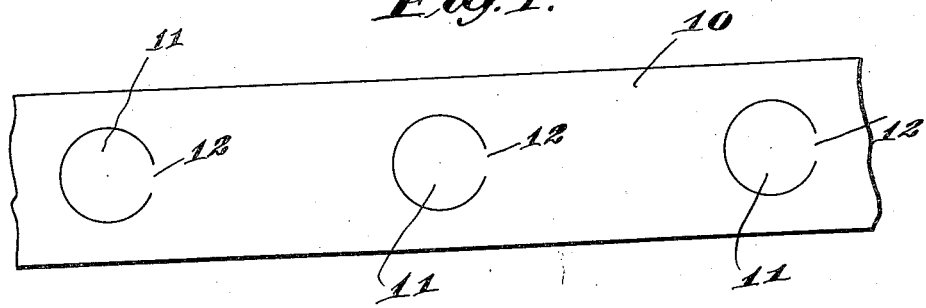
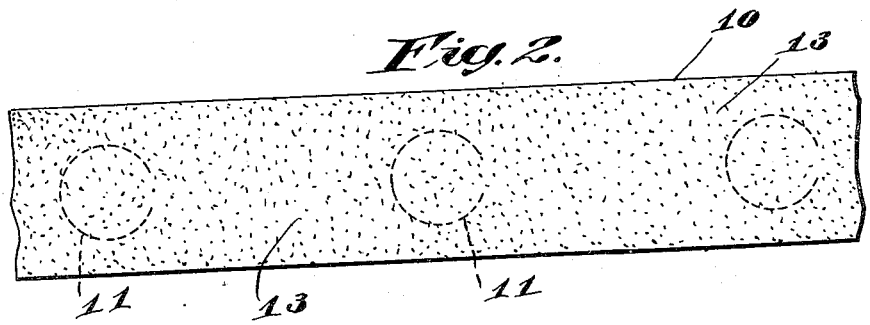
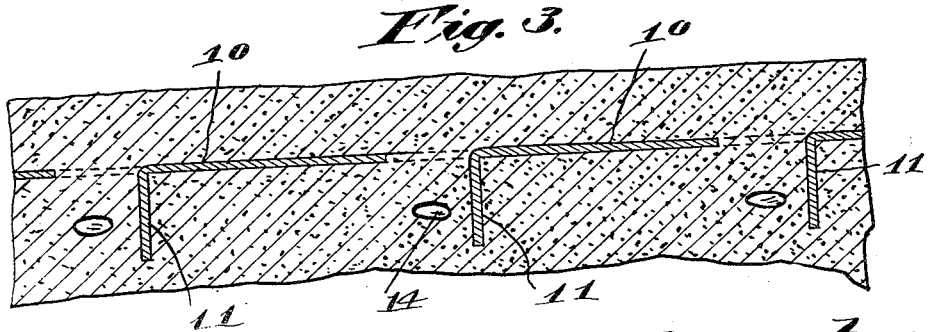
Inventor
Edward R. Pratt
By James C. Hamilton
Attorney Patented Feb. 11, 1936

2,030,267

UNITED STATES PATENT OFFICE 2,030,267

FERTILIZED MULCH PAPER

Edward Roy Pratt, West Medford, Mass.

Application January 7, 1935, Serial No. 718

7 Claims. (Cl. 47—9)

My present invention relates to gardening and more particularly to an improved fertilized mulch paper.

The principal object of my invention is an improved mulch paper;

Another object is an improved mulch paper provided with a means for anchorage combined with planting openings;

Other objects and novel features comprising the construction and operation of my invention will appear as the description of the same progresses.

Referring to the drawing illustrating the preferred embodiment of my invention;

Fig. 1 shows a plan view of the top of the mulch paper ribbon;

Fig. 2 is a bottom plan of the same ribbon, and

Fig. 3 is a typical vertical cross-section of the ribbon in the ground after planting, the section being taken through the long dimension of the ribbon.

Referring more in detail to my invention, 10 indicates a fragmentary strip of the mulch paper which is further provided with a series of partially punched discs 11, the discs being left attached to the ribbon 10 at the point 12 and the disc 11 being left in the ribbon 10 as shown in the drawing.

After the discs are cut out as described above, the bottom side of the ribbon is coated with a prepared fertilizer mixed with any suitable sizing, as glue, as indicated at 13. It will be noted that this side of the ribbon after having been coated presents a continuous plane surface the cut out lines of the discs 11 being indicated in dotted lines.

When the mulch paper is used the operator pushes the discs down breaking away the film of prepared fertilizer around the punched outline of the dics. The discs are now pushed down in the ground as the mulch paper ribbon is laid down, the seed 14 being placed in the now open holes previously occupied by the discs 11 and the top soil put in place as shown in Fig. 3. The mulch paper will act as a screen for the retaining and filtering of moisture and the partial prevention of weed growth when covered over by soil.

By means of the discs the paper is temporarily anchored in place while the planting operation progresses and a long row of seed can be placed at one time without the ribbon 10 becoming misplaced or moved sideways due to wind or other disturbances.

I also have in mind in the preparation of my improved mulch paper the production of varying grades of mulch paper, the difference in grading being due to the amount of fertilizer used incorporated with the paper and further in this connection I propose to associate a sizing in combination with the fertilizer so as to fix the time that it takes for the fertilizer to be entirely disseminated, depending on the length of time which a particular seed requires to mature. It is also suggested that a fabric material may be used in combination with a fertilizer or fungicide applied in various manners to supply nourishment to the embryo during the period of maturity of the seedling plant to filter moisture there around and to eliminate weed growth. Of course in any of these modifications, I may provide the paper so treated either in single rolls or multiple rolls, having several sides of perforated discs or anchor members which could be used collectively or singly as required.

Having thus described my invention what I claim as new is:

1. An improved fertilized mulch paper comprising in combination, a paper ribbon coated on one side with a prepared fertilizer, partially pierced disc members located at intervals along said ribbon.

2. An improved fertilized mulch paper comprising in combination, a paper ribbon coated on one side with a prepared fertilizer, disc-like anchor members pierced from said ribbon and adapted to be bent at ninety degrees to the top of said ribbon.

3. An improved fertilized mulch paper comprising in combination, a paper ribbon provided with partially pierced disc-like anchor members, prepared fertilizer coating applied to the under surface of said ribbon including that portion comprising said anchor members.

4. An improved mulch screen, said screen having the form of a thin ribbon of material with partially pierced discs located thereon, the under side of said discs and adjoining ribbon coated with prepared fertilizer.

5. A roll of improved fertilized mulch paper comprising a plurality of rows, with disc-like anchor members adapted to be pierced from said mulch paper and be bent at ninety degrees to the under side of said mulch paper.

6. An improved fertilized mulch paper comprising in combination, a paper ribbon coated on one side with a fertilizer and a fixing agent, partially pierced disc members located on the edge of said ribbon.

7. An improved fertilized mulch cloth comprising in combination, a fabric ribbon coated on one side with a prepared fertilizer and a fixing agent adapted to slow the rate of dispersion of said fertilizer, disc-like anchor members pierced from said ribbon.

EDWARD ROY PRATT.